US006848076B1

(12) United States Patent
Genty et al.

(10) Patent No.: US 6,848,076 B1
(45) Date of Patent: Jan. 25, 2005

(54) AUTOMATIC FETCHING AND STORAGE OF REQUESTED PRIMARY AND RELATED DOCUMENTS OR FILES AT RECEIVING WEB STATIONS AFTER REPEATED FAILURES TO ACCESS SUCH DOCUMENTS OR FILES FROM THE WORLD WIDE WEB

(75) Inventors: Denise Marie Genty, Austin, TX (US); Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 09/599,181

(22) Filed: Jun. 22, 2000

(51) Int. Cl.[7] .............................................. G06F 17/00
(52) U.S. Cl. ................................ 715/501.1; 715/500.1; 715/515
(58) Field of Search ................................ 707/10, 104.1; 715/513, 501; 709/203, 208, 217, 200, 229; 711/118

(56) References Cited

U.S. PATENT DOCUMENTS 5,678,007 A * 10/1997 Hurvig ....................... 709/227
6,167,448 A * 12/2000 Hemphill et al. ............ 709/224
6,282,542 B1 * 8/2001 Carneal et al. ............... 707/10
6,442,651 B2 * 8/2002 Crow et al. .................. 711/118
6,601,098 B1 * 7/2003 Case et al. ................... 709/224
6,618,754 B1 * 9/2003 Gosling ....................... 709/220

* cited by examiner

Primary Examiner—Joseph Feild
Assistant Examiner—Gautam Sain
(74) Attorney, Agent, or Firm—Diana C. Roberts; Jerry Kraft

(57) ABSTRACT

Minimizing the effects that repetitive failures to access requested documents or files will have on the user requesting the files through a receiving network or World Wide Web (Web) station. When there is a network, e.g. Web failure in the access of a requested document, the system will retry to access. However, when the failed retries reaches a selected number, the system will then continue to try to access the requested document and, when that document is finally accessed, the system will automatically store the document in an appropriate cache associated with the requesting receiving station. Documents related to this initial document will also be automatically accessed from the Web and stored at the receiving station together with the initial document. Note, these related documents may be documents accessed through hyperlinks in the initial document.

21 Claims, 4 Drawing Sheets

US 6,848,076 B1

AUTOMATIC FETCHING AND STORAGE OF REQUESTED PRIMARY AND RELATED DOCUMENTS OR FILES AT RECEIVING WEB STATIONS AFTER REPEATED FAILURES TO ACCESS SUCH DOCUMENTS OR FILES FROM THE WORLD WIDE WEB

TECHNICAL FIELD

The present invention relates to computer managed communication networks such as the World Wide Web (Web) and, particularly, to ease of use of interactive computer controlled Web stations to receive files and documents transmitted over the Web.

BACKGROUND OF RELATED ART

The 1990's decade has been marked by a technological revolution driven by the convergence of the data processing industry with the consumer electronics industry. The effect has, in turn, driven technologies which have been known and available but relatively quiescent over the years. A major one of these technologies is the Internet or Web related distribution of documents, media and files. The convergence of the electronic entertainment and consumer industries with data processing exponentially accelerated the demand for wide ranging communication distribution channels and the Web or Internet, which had quietly existed for over a generation as a loose academic and government data distribution facility, reached "critical mass" and commenced a period of phenomenal expansion. With this expansion, businesses and consumers have direct access to all matter of documents, and computer files.

This rapid expansion has brought in hundreds of millions of Web users, many of whom have relatively little computer skills and sophistication. Consequently, it is critical to the continued expansion of the Web that access to the Web be as simple as possible for the unskilled users and transparent to any problems encountered in operations needed to access requested files or documents. This simplicity in interfacing with the Web must be maintained despite the fact that the rapidly expanding demand for Web facilities and resources has strained the communication capacity and resources of the Web. There is a need in network communications and particularly in the Web for implementations to handle repetitive failures to receive requested documents or files efficiently and transparently to the user.

SUMMARY OF THE PRESENT INVENTION

The present invention provides a solution which minimizes the effects that repetitive failures to access requested documents or files will have on the user requesting the files through a receiving network or Web station. Thus, the present invention provides a computer managed communication network, such as the Web, with user access via a plurality of data processor controlled receiving stations, e.g. Web stations, a system for accessing at a receiving station data components transmitted from locations on said network, remote from said receiving station, which includes conventional means for requesting the transmission of data components from one of said locations to said receiving display station. But then, if there is a failure to access the document or file, there is provided means for tracking each failure of said receiving station to receive a requested first data component (document or file); the system provides the user or the Web access program developer with the means for determining when said failures have reached a selected number; together with means, responsive to the receiving of said requested first data component at said receiving station after said failures have reached said selected number, for requesting the transmission to said receiving station of other data components related to said first data component. This system and method are particularly applicable to network file systems in which case, data components are files, and to the Web or Internet, in which case the components are Web documents or pages.

With the system of the present invention, when there is a network, e.g. Web, failure in the access of a requested document, the system will retry to access. However, when the failed retries reaches a selected number, the system will then continue to try to access the requested document, and when that document is finally accessed, the system will automatically store the document in an appropriate cache associated with the requesting receiving station. Also, documents related to this initial document will also be automatically accessed from the Web and stored at the receiving station together with the initial document. It should be noted that these related documents may be documents accessed through hyperlinks in the initial document. The number of repetitive failures to receive before the initial and related documents are stored at the receiving Web station may preferably be a number, the occurrence of which indicates that such failures have a likelihood of recurring in the immediate future and are also likely to occur in the accessing of related documents or files. Thus, if the initial documents and their related documents are accessed and stored at the receiving station, then, the next time that such documents are needed, instead of being accessed from the Web, they may be accessed directly from a storage cache associated with the receiving Web station. All of the organization required to track the number of repetitive failures to access documents and the consequent storage of initial and related documents or files, as well as the subsequent direct access of such documents or files from storage, could be carried out through a Web browser. Also, it may be done with such transparency to the user that the user is unaware of the repetitive failures to access, the tracking and resulting storage and subsequent direct accessing from storage. All the user might notice may be some time differences in displaying requested documents or files.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
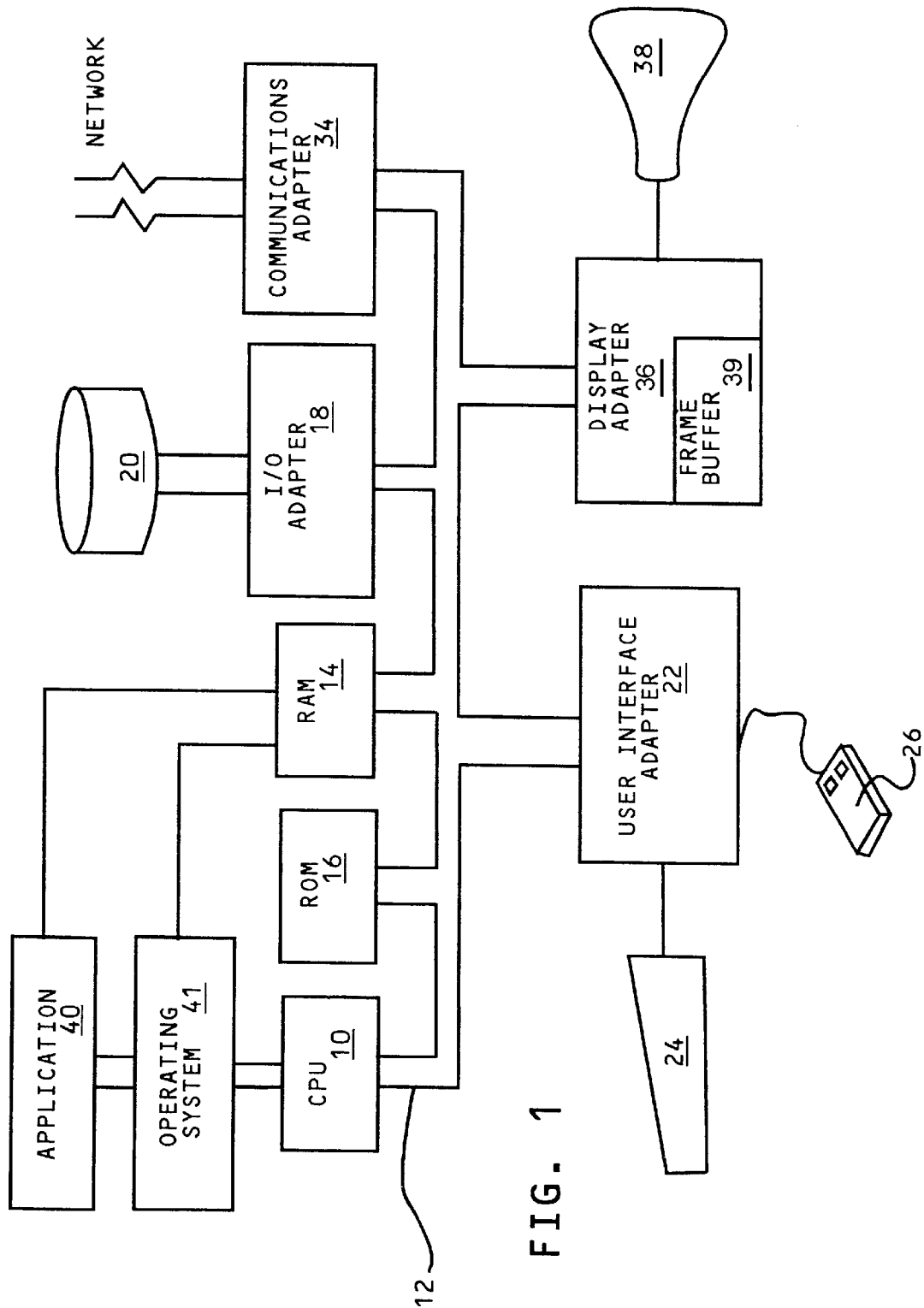
FIG. 1 is a block diagram of a data processing system including a central processing unit and network connections via a communications adapter which is capable of implementing a user interactive workstation on which the received data may be converted into a displayed Web document and pages and documents linked to the Web document are accessed and stored in accordance with the present invention.

Referring to FIG. 1, a typical data processing terminal is shown which may function as the computer controlled network terminal or Web display station used for receiving Web pages. A central processing unit (CPU) 10, such as one of the PC microprocessors or workstations, e.g. RISC System/6000™ (RS/6000) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system available from IBM; Microsoft's Windows 98™ or Windows NT™, as well as UNIX and AIX operating systems. Application programs 40, controlled by the system, are moved into and out of the main memory Random Access Memory (RAM) 14. These programs include the programs of the present invention for the tracking of repetitive failures in accessing of Web documents and for caching Web documents and their related Web documents after the repetitive failures reach a selected number, which will subsequently be described in combination with any conventional Web browser, such as the Netscape Navigator 3.0™ or Microsoft's Internet Explorer™. A read only memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside network enabling the data processing system to communicate with other such systems over a Local Area Network (LAN) or a Wide Area Network (WAN), which includes, of course, the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to Web pages. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods which may be related to the present invention. Since a major aspect of the present invention is directed to Web pages, transmitted over global networks, such as the Web or Internet, an understanding of networks and their operating principles would be helpful. We will not go into great detail in describing the networks to which the present invention is applicable. For details on Web nodes, objects and links, reference is made to the text, *Mastering the Internet*, G. H. Cady et al., published by Sybex Inc., Alameda, Calif., 1996; or the text, *Internet: The Complete Reference, Millennium Edition*, Margaret Young et al., Osborne/McGraw-Hill, Berkeley, Calif., 1999.

Any data communication system which interconnects or links computer controlled systems with various sites defines a communications network. Of course, the Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. Web documents are conventionally implemented in Hypertext Markup Language (HTML) language, which is described in detail in the text entitled *Just Java*, van der Linden, 1997, SunSoft Press, particularly at Chapter 7, pp. 249–268, dealing with the handling of Web pages; and also in the above-referenced Mastering the Internet, particularly pp. 637–642, on HTML in the formation of Web pages. In addition, aspects of this invention will involve Web browsers. A general and comprehensive description of browsers may be found in the above-mentioned *Mastering the Internet* text at pp. 291–313. More detailed browser descriptions may be found in the above-mentioned *Internet: The Complete Reference, Millennium Edition* text: Chapter 19, pp. 419–454, on the Netscape Navigator; Chapter 20, pp. 455–494, on the Microsoft Internet Explorer; and Chapter 21, pp. 495–512, covering Lynx, Opera and other browsers.

While the illustrative examples which are being used relate to Web pages and documents, it should be understood that the present invention is also applicable to the accessing of other data components from networks such as the accessing of files. The transmission of files and their access from the Web is described in detail in the above-mentioned text, *Internet: The Complete Reference, Millennium Edition*, Chapters 36, 37 and 38, pp. 830–881; Web File Transfer Protocols (FTP), which are described at pp. 840–863, are used. Also, the handling and accessing of files through Web browsers using FTP is discussed on pp. 860–861.

Figure 2:
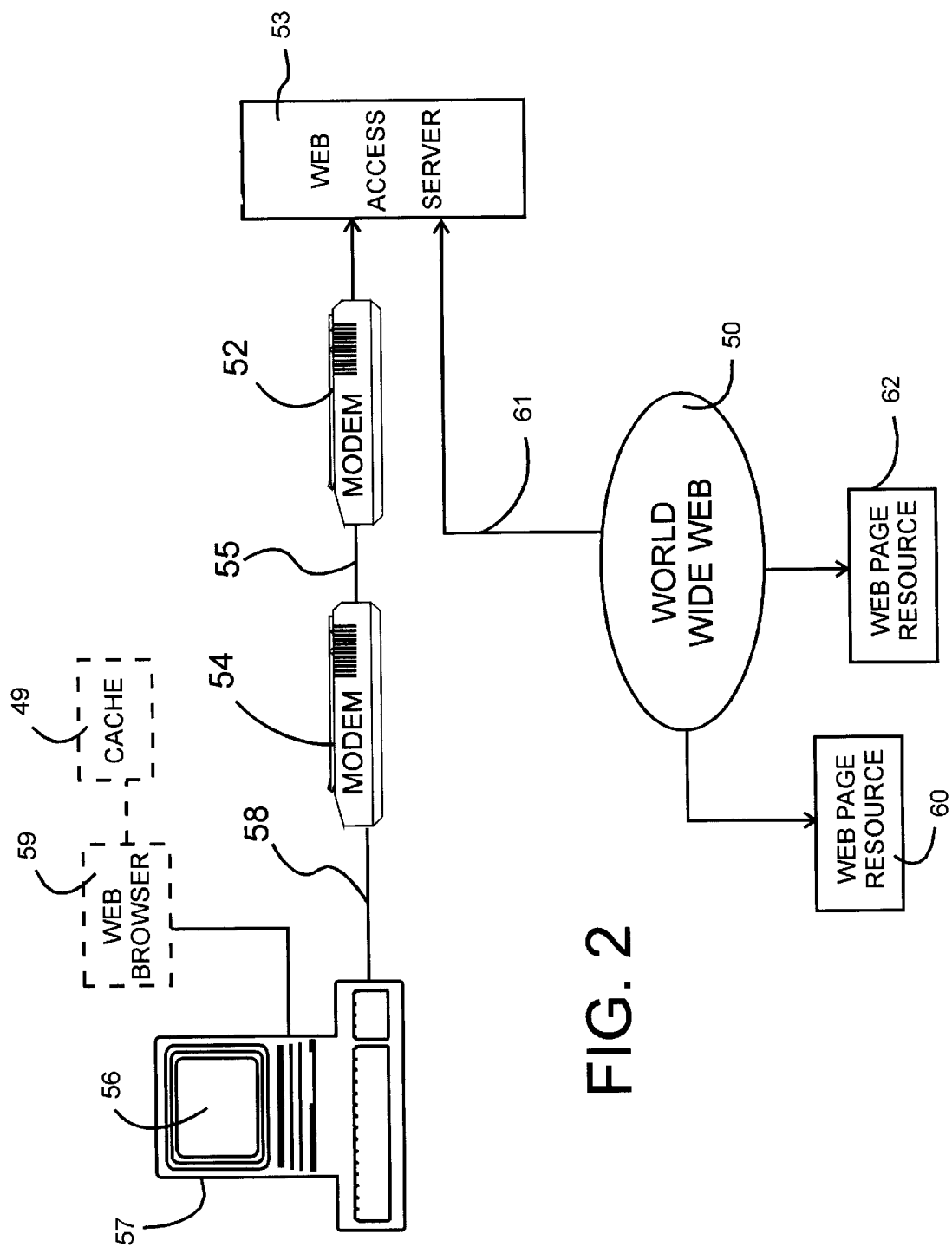
FIG. 2 is a generalized diagrammatic view of a Web portion upon which the present invention may be implemented.

A generalized diagram of a portion of the Web in which the computer controlled display terminal 57 is used for receiving Web pages or documents using a Web browser, 59 and cache 49 is connected as shown in FIG. 2. Computer display terminal 57 with display 56 may be implemented by the computer system setup in FIG. 1, and connection 58 (FIG. 2) is the network connection shown in FIG. 1.

Reference may be made to the above-mentioned *Mastering the Internet*, pp. 136–147, for typical connections between local display stations to the Web via network servers, any of which may be used to implement the system on which this invention is used. The system embodiment of FIG. 2 has a host-dial connection. Such host-dial connections have been in use for over 30 years through network access servers 53 which are linked 61 to the Web 50. The servers 53 may be maintained by a service provider to the client's display terminal 57. The host's server 53 is accessed by the client terminal 57 through a normal dial-up telephone linkage 58 via modem 54, telephone line 55 and modem 52. Web documents are downloaded to display terminal 57 through Web access server 53 via the telephone line linkages from server 53, which may have accessed them from the Web 50 via linkage 61. The Web pages or documents are accessed via the Web from remote Web page resources 60 and 62. The Web browser program 59 operates within the display terminals 57 computer to control the communication with the Web access server 53 to thereby download and display the accessed Web pages on terminal 57. The programs of the present invention for tracking of access failures and the subsequent caching of documents in cache 49 may be implemented in combination with browser 59.

Figure 3:
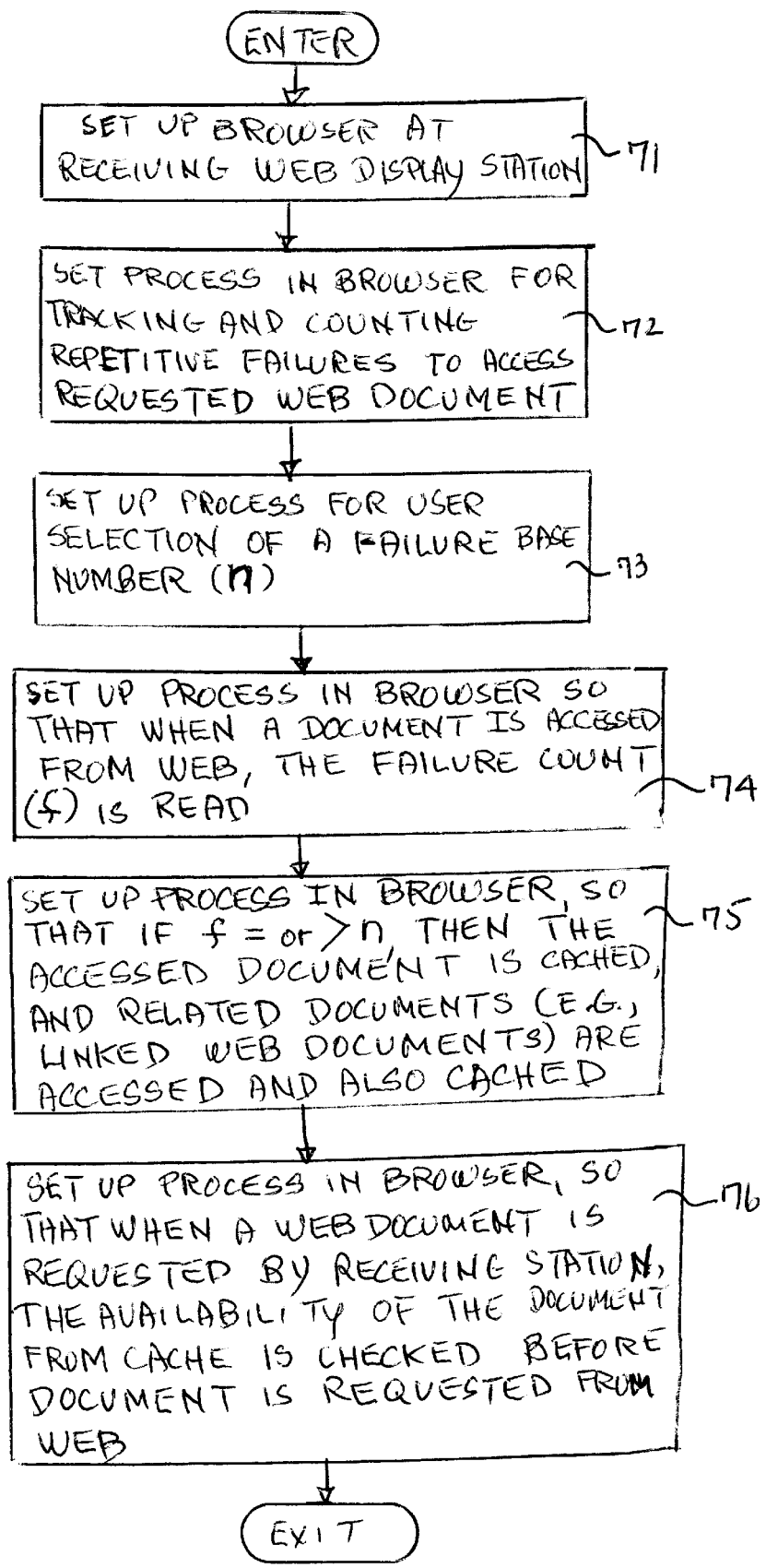
FIG. 3 is an illustrative flowchart describing the setting up of the elements needed for the program for tracking repetitive failures in accessing of Web documents and for caching Web documents and their related Web documents after the repetitive failures reach a selected number.

FIG. 3 is a flowchart showing the development of a process according to the present invention for tracking repetitive failures in accessing of Web documents and for caching Web documents and their related Web documents after the repetitive failures reach a selected number. A Web browser is provided at a receiving display station on the Web for accessing Web pages in the conventional manner and downloading them at the receiving display station, step 71.

A process is set up within the browser program for keeping track of and counting the number of repetitive failures to access a requested Web document, step 72. These repetitive failures being tracked and counted may preferably be in an uninterrupted sequence or they may be intermittent failures to receive a particular document. If the sequence of failures being tracked is uninterrupted, then a single counter and a continuously recycled document request for the same document used until the document is finally accessed. On the other hand, the browser program may be set up so that attempts at accessing other Web documents may be made in between the repetitive requests for a particular document. In such a situation, there may be several ongoing failures to access several Web documents. Then, each document having access failures must be simultaneously tracked and its failures counted.

In any event, a process is set up to permit the user to select, a base number "n" which would represent the number of repetitive failures which must occur before the system will take the corrective action in accordance with the present invention, step 73. A process is also set up in association with the browser so that each time the user at a receiving station requests a document which is successfully accessed from the Web, the browser has the failure count "f" read, step 74, after which a process has been set to compare "f" to "n", the base number, step 75. If "f" equals or is greater than "n", then the successfully accessed document is cached and the process is set to access its related documents, e.g. the documents accessible through hyperlinks in the successfully accessed Web document. These Web documents are also cached. A process is also set up so that the requesting Web station goes to this cache before going to the Web for a document, step 76. In this manner, documents subject to access failures and their related documents are stored at a receiving Web station likely to require such documents.

Figure 4:
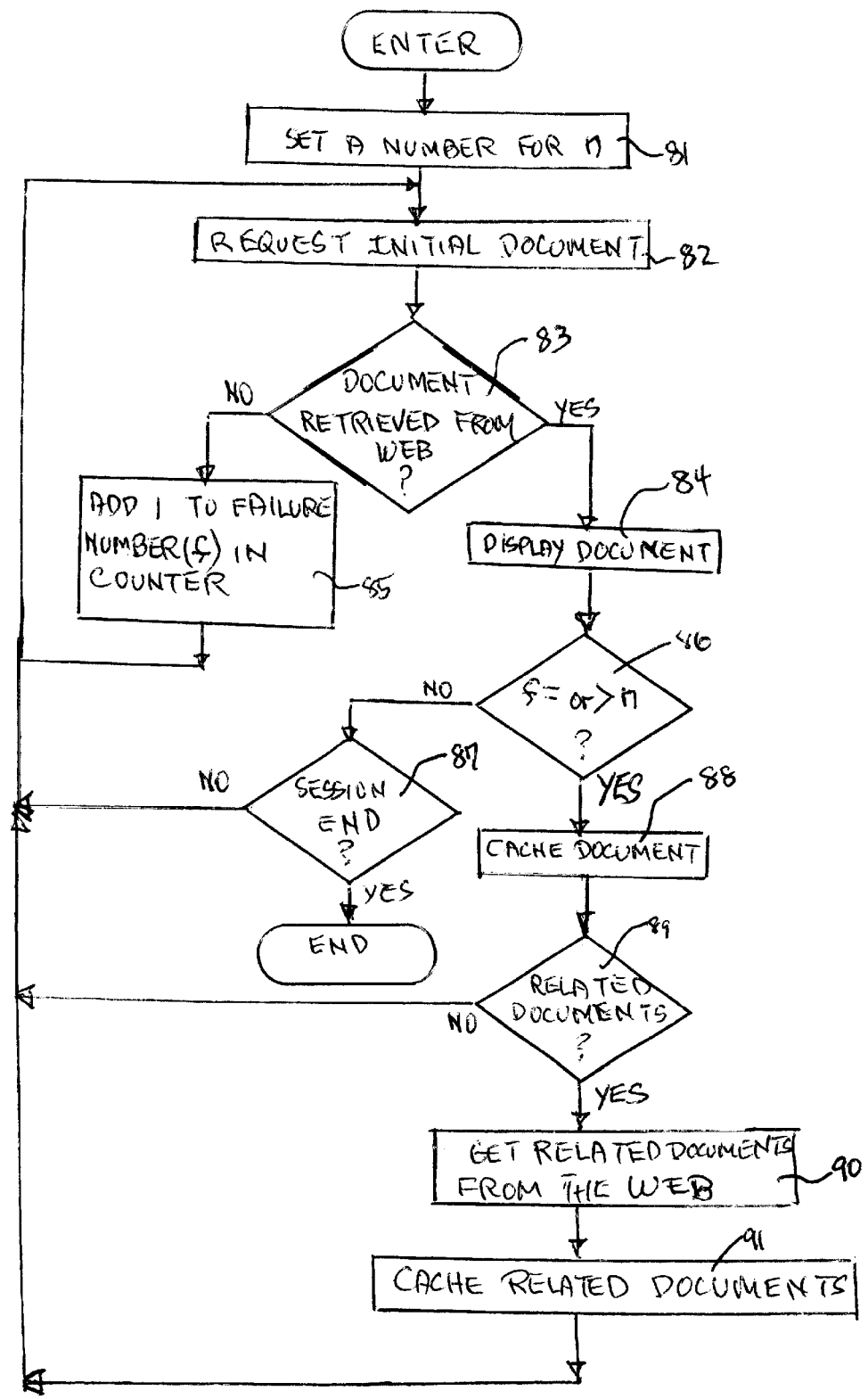
FIG. 4 is a flowchart of an illustrative run of the program set up in FIG. 3.

The running of the process set up in FIG. 3 will now be described with respect to the flowchart of FIG. 4. The flowchart represents some steps in a routine which will illustrate the operation of the invention. The user or the user's system manager sets the base repetitive number, "n", step 81. The number is chosen based upon the user's access time needs together with the user's storage cache capacity, among other criteria. A document is initially requested from the Web by the browser of a receiving station, step 82. For simplicity of illustration, we are assuming that with this initial document request there are no documents already stored in the cache at this receiving Web station. Otherwise, in accordance with the invention, the browser should first check the cache for the document before going to the Web to access the document. In any event, we are assuming that the requested document is not in a local cache. Next, decision step 83, a determination is made as to whether the requested document has been successfully retrieved from the Web. If No, "1" is added to the failure number "f" in the counter tracking failures, step 85, and the process is branched back to step 82 where the document is again requested. The success of the retrieval is again determined, step 83, and the counter for "f" is increased by 1 for each failure, step 85. Finally, when there is a successful retrieval of the requested Web document, then a Yes decision from step 83 results in a display of the received Web document for interactive use. Then a determination is made, step 86, as to whether "f" equals or is greater than "n". If Yes, the failures have exceeded the selected base number, the retrieved document is cached, step 88, and a determination is made as to whether there are any related Web documents, e.g. hyperlinked Web documents, step 89. If Yes, the related documents are fetched from the Web, step 90, the related documents are also cached, step 91, and the process is branched back to step 82 where another Web document may be requested. If there were no related documents, then, step 89, the decision would be No, and the process would also be branched back to step 82. Also, if the decision from step 86 had been No, the number of failures, "f" did not exceed the threshold, "n", then a determination could be conveniently made at this point as to whether the session would be over, step 87. If Yes, the session would be ended. If No, the process would again be returned to step 82.

In the above-described embodiments of the present invention, storing in a cache, such as cache 49, associated with the browser has been involved in implementing the invention. Conventional browsers each have caching provisions in which there is set aside portions of the receiving station RAM 14 and disk storage 20, FIG. 1, for caching purposes. Any of these conventional caching functions could be used in the present invention. The stored documents could be passed through the cache on a first-in, first-out arrangement in the case of caches with limited storage; or the stored data could be cleaned out of the cache after a fixed time, as examples.

One of the preferred implementations of the present invention is in application program 40, i.e. a browser program made up of programming steps or instructions resident in RAM 14, FIG. 1, of a Web receiving station during various Web operations. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Web itself, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer managed communication network with user access via a plurality of data processor controlled receiving stations, a system for accessing at a receiving station data components transmitted from locations on said network remote from said receiving station comprising:

means for requesting the transmission of data components from one of said locations to said receiving station;

means, responsive to a failure of said receiving station to receive a requested first data component, for causing said means for requesting to again request the transmission of said data component;

means for tracking each failure of said receiving station to receive said requested first data component;

means for determining when said failures have reached a selected number; and means, responsive to the receiving of said requested first data component at said receiving station after said failures have reached said selected number, for requesting the transmission to said receiving station of other data components related to said first data component.

2. The system of claim 1 wherein:

said system is a network file system, and said data components are files.

3. The system of claim 1 wherein said receiving stations are data processor controlled receiving display stations.

4. The system of claim 3 wherein:

said network is the World Wide Web, and said data components are World Wide Web documents.

5. The system of claim 4 further including:

means for storing, at said receiving display station, said received first World Wide Web document and said other related World Wide Web documents whereby said World Wide Web documents are subsequently available to said receiving display station without accessing said documents from said World Wide Web.

6. The system of claim 5 further comprising:

World Wide Web browsing means at said receiving display station including:

said means for tracking each failure of said receiving station to receive a requested first World Wide Web document;

said means for determining when said failures have reached a selected number; and said means, responsive to the receiving of said requested first World Wide Web document at said receiving station after said failures have reached said selected number, for requesting the transmission of other World Wide Web documents related to said first World Wide Web document.

7. The system of claim 6 wherein said other World Wide Web documents are related to said first World Wide Web document through links in said first World Wide Web document.

8. In a computer managed communication network with user access via a plurality of data processor controlled receiving stations, a method for accessing at a receiving station data components transmitted from locations on said network remote from said receiving station comprising:

requesting the transmission of data components from one of said locations to said receiving station;

responsive to a failure of said receiving station to receive a requested first data component, again requesting the transmission of said data component;

tracking each failure of said receiving station to receive said requested first data component;

determining when said failures have reached a selected number; and responsive to the receiving of said requested first data component at said receiving station after said failures have reached said selected number, requesting the transmission to said receiving station of other data components related to said first data component.

9. The method of claim 8 wherein:

said method is a network filing method, and said data components are files.

10. The method of claim 8 wherein said receiving stations are data processor controlled receiving display stations.

11. The method of claim 10 wherein:

said network is the World Wide Web, and said data components are World Wide Web documents.

12. The method of claim 11 further including the step of:

storing, at said receiving display station, said received first World Wide Web document and said other related World Wide Web documents whereby said World Wide Web documents are subsequently available to said receiving display station without accessing said documents from said World Wide Web.

13. The method of claim 12 further including:

a World Wide Web browsing procedure at said receiving display station including said steps of:

tracking each failure of said receiving station to receive a requested first World Wide document;

determining when said failures have reached a selected number; and responsive to the receiving of said requested first World Wide Web document at said receiving station after said failures have reached said selected number, for requesting the transmission of other World Wide Web documents related to said first World Wide Web document.

14. The method of claim 13 wherein said other World Wide Web documents are related to said first World Wide Web document through links in said first World Wide Web document.

15. A computer program having code recorded on a computer readable medium for accessing at a data processor controlled receiving station, data components transmitted from locations on a computer managed communication network remote from said receiving station comprising:

means for requesting the transmission of data components from one of said locations to said receiving station;

means, responsive to a failure of said receiving station to receive a requested first data component causing said means for requesting to again request the transmission of said data component;

means for tracking each failure of said receiving station to receive said requested first data component;

means for determining when said failures have reached a selected number; and means, responsive to the receiving of said requested first data component at said receiving station after said failures have reached said selected number, for requesting the transmission to said receiving station of other data components related to said first data component.

16. The computer program of claim 15 wherein;

said system is a network file system, and said data components are files.

17. The computer program of claim 15 wherein said receiving stations are data processor controlled receiving display stations.

18. The system of claim 17 wherein:

said network is the World Wide Web, and said data components are World Wide Web documents.

19. The computer program of claim 18 further including:

means for storing, at said receiving display station, said received first World Wide Web document and said other related World Wide Web documents whereby said World Wide Web documents are subsequently available to said receiving display station without accessing said documents from said World Wide Web.

20. The computer program of claim 19 further comprising:

a World Wide Web browser program at said receiving display station including:

said means for tracking each failure of said receiving station to receive a requested first World Wide Web document;

said means for determining when said failures have reached a selected number; and said means, responsive to the receiving of said requested first World Wide Web document at said receiving station after said failures have reached said selected number, for requesting the transmission of other World Wide Web documents related to said first World Wide Web document.

21. The computer program of claim 20 wherein said other World Wide Web documents are related to said first World Wide Web document through links in said first World Wide Web document.

* * * * *